United States Patent
Corcoran

(10) Patent No.: US 10,146,924 B2
(45) Date of Patent: Dec. 4, 2018

(54) SYSTEMS AND METHODS FOR AUTHENTICATING A BIOMETRIC DEVICE USING A TRUSTED COORDINATING SMART DEVICE

(71) Applicant: FotoNation Limited, Galway (IE)

(72) Inventor: Peter Corcoran, Galway (IE)

(73) Assignee: FotoNation Limited (IE)

( * ) Notice: Subject to any disclaimer, the term of this patent is extended or adjusted under 35 U.S.C. 154(b) by 0 days.

(21) Appl. No.: 15/841,639

(22) Filed: Dec. 14, 2017

(65) Prior Publication Data
US 2018/0165439 A1    Jun. 14, 2018

Related U.S. Application Data

(60) Provisional application No. 62/434,298, filed on Dec. 14, 2016.

(51) Int. Cl.
G06F 21/00 (2013.01)
G06F 21/32 (2013.01)
(Continued)

(52) U.S. Cl.
CPC .............. *G06F 21/32* (2013.01); *G06K 9/00* (2013.01); *G06K 9/00926* (2013.01); *H04L 9/08* (2013.01);
(Continued)

(58) Field of Classification Search
CPC .......... G06F 21/30; G06F 21/31; G06F 21/32; G06F 21/34; G06F 21/35; G06F 21/42;
(Continued)

(56) References Cited

U.S. PATENT DOCUMENTS

2007/0291995 A1   12/2007   Rivera
2010/0290618 A1   11/2010   Slawomir et al.
(Continued)

FOREIGN PATENT DOCUMENTS

WO   2014131015 A2   8/2014
WO   2014131029 A2   8/2014
(Continued)

OTHER PUBLICATIONS

Grzonkowski et al., "Extending Web Applications with a Lightweight Zero Knowledge Proof Authentication", CSTST '08, Proceedings of the 5th International Conference on Soft Computing as Transdisciplinary Science and Technology, ACM, Oct. 28-31, 2008, Cergy-Pontoise, France, pp. 65-70, doi:10.1145/1456223.1456241.
(Continued)

*Primary Examiner* — Edward Zee
(74) *Attorney, Agent, or Firm* — KPPB LLP

(57) ABSTRACT

Systems and methods for authenticating a biometric device using a trusted coordinating smart device in accordance with embodiments of the invention are disclosed. In one embodiment, a process for enrolling a configurable biometric device with a network service includes obtaining a device identifier (ID) of the configurable biometric device using a coordinating smart device, communicating the device ID from the coordinating smart device to a network service, communicating a first challenge based on a challenge-response authentication protocol from the network service to the coordinating smart device, communicating the first challenge and a response uniform resource locator (URL) from the coordinating smart device to the configurable biometric device, generating a first response to the first challenge and communicating the first response to the network service utilizing the response URL, receiving a secure channel key by the coordinating smart device from the network service,
(Continued)

communicating the secure channel key from the coordinating smart device to the configurable biometric device, performing a biometric enrollment process using the configurable biometric device including capturing biometric information from a user, and creating a secure communication link between the configurable biometric device and the network service using the secure channel key when the first response satisfies the challenge-response authentication protocol.

15 Claims, 4 Drawing Sheets

(51) Int. Cl.
| | | |
|---|---|---|
| *G06K 9/00* | (2006.01) | |
| *H04L 9/32* | (2006.01) | |
| *H04L 29/06* | (2006.01) | |
| *H04L 9/08* | (2006.01) | |
| *H04L 29/14* | (2006.01) | |
| *H04W 12/06* | (2009.01) | |

(52) U.S. Cl.
CPC .............. *H04L 9/0819* (2013.01); *H04L 9/32* (2013.01); *H04L 9/3221* (2013.01); *H04L 9/3271* (2013.01); *H04L 63/0853* (2013.01); *H04L 69/40* (2013.01); *H04W 12/06* (2013.01)

(58) Field of Classification Search
CPC ......... G06F 21/44; G06F 21/445; H04L 9/08; H04L 9/0861; H04L 9/32; H04L 9/321; H04L 9/3215; H04L 9/3218; H04L 9/3221; H04L 9/3271
See application file for complete search history.

(56) References Cited

U.S. PATENT DOCUMENTS

| | | |
|---|---|---|
| 2014/0108810 A1* | 4/2014 | Chenna .................. H04L 9/321 713/179 |
| 2014/0183258 A1 | 7/2014 | DiMuro |
| 2015/0317638 A1 | 11/2015 | Donaldson |
| 2016/0267486 A1 | 9/2016 | Mitra et al. |
| 2017/0011405 A1 | 1/2017 | Pandey |
| 2017/0109742 A1 | 4/2017 | Varadarajan |
| 2018/0005244 A1 | 1/2018 | Govindarajan et al. |
| 2018/0189767 A1 | 7/2018 | Bigioi |

FOREIGN PATENT DOCUMENTS

| | | |
|---|---|---|
| WO | 2014131035 A1 | 8/2014 |
| WO | 2014131038 A1 | 8/2014 |

OTHER PUBLICATIONS

Stajano, "Pico: No more passwords!", Security Protocols XIX, Security Protocols 2011, Lecture Notes in Computer Science, vol. 7114, Springer, Berlin, Heidelberg, 34 pages, https://doi.org/10.1007/978-3-642-25867-1_6.

Van Der Wal et al., , "The Acadia Vision Processor", Proceedings Fifth IEEE International Workshop on Computer Architectures for Machine Perception, Sep. 13, 2000, Padova, Italy, pp. 31-40.

* cited by examiner

SYSTEMS AND METHODS FOR AUTHENTICATING A BIOMETRIC DEVICE USING A TRUSTED COORDINATING SMART DEVICE

CROSS-REFERENCE TO RELATED APPLICATIONS

The current application claims priority to U.S. Provisional Application No. 62/434,298, filed Dec. 14, 2016, the disclosure of which is incorporated herein by reference in its entirety.

FIELD OF THE INVENTION

Systems and methods in accordance with various embodiments of the invention relate to authentication of a biometric device and more specifically to authenticating a biometric device using a trusted coordinating smart device as an intermediary to a network service.

BACKGROUND OF THE INVENTION

Many consumer devices provide biometric authentication whereby biometric information, a person's intrinsic physical and/or behavioral characteristics, can be captured. Actuation of a biometric device typically requires identifying an individual user as an authorized user using measurement and statistical analysis of biometric information of the user. Biometric devices can be simple, lean devices such as a standalone camera or fingerprint reader that does not include a full operating system and/or other features. Biometric devices can also include full featured devices such as smartphones or computers having peripherals for capturing biometric information.

SUMMARY OF THE INVENTION

Systems and methods for authenticating a biometric device using a trusted coordinating smart device in accordance with embodiments of the invention are disclosed. In one embodiment, a process for enrolling a configurable biometric device with a network service includes obtaining a device identifier (ID) of the configurable biometric device using a coordinating smart device, communicating the device ID of the configurable biometric device from the coordinating smart device to a network service using a secure communications link, communicating a first challenge from the network service to the coordinating smart device, where the first challenge is generated based on a challenge-response authentication protocol, communicating the first challenge and a response uniform resource locator (URL) from the coordinating smart device to the configurable biometric device, generating a first response to the first challenge and communicating the first response to the network service utilizing the response URL, receiving a secure channel key by the coordinating smart device from the network service, communicating the secure channel key from the coordinating smart device to the configurable biometric device, performing a biometric enrollment process using the configurable biometric device including capturing biometric information from a user, and creating a secure communication link between the configurable biometric device and the network service using the secure channel key when the first response satisfies the challenge-response authentication protocol.

In a further embodiment, the challenge-response authentication protocol is a zero-knowledge protocol (ZKP) and the first challenge is generated based on an identifier of the configurable biometric device.

In another embodiment, obtaining a unique device identifier (ID) of the configurable biometric device using a coordinating smart device includes scanning a visual tag on the configurable biometric device using a camera on the coordinating smart device.

In a still further embodiment, obtaining a unique device identifier (ID) of the configurable biometric device using a coordinating smart device includes reading a radio frequency tag on the configurable biometric device using radio frequency reader circuitry on the coordinating smart device.

In still another embodiment, the process also includes verifying the local presence of the configurable biometric device to the coordinating smart device.

In a yet further embodiment, the process also includes authenticating a user on the coordinating smart device to create the secure communications link between the coordinating smart device and the network service.

In yet another embodiment, the coordinating smart device is part of a key-chained cloud service (KCS) and the method also includes associating the configurable biometric device with the coordinating smart device and the user associated with the coordinating smart device.

In a further embodiment again, communicating the first challenge and a response uniform resource locator (URL) from the coordinating smart device to the configurable biometric device is performed using a different communication medium than obtaining a device identifier (ID) of the configurable biometric device using a coordinating smart device.

In another embodiment again, communicating the first challenge and a response uniform resource locator (URL) from the coordinating smart device to the configurable biometric device utilizes a coded audio signal.

In a further additional embodiment, communicating the first challenge and a response uniform resource locator (URL) from the coordinating smart device to the configurable biometric device utilizes a coded light signal.

In another additional embodiment, communicating the first challenge and a response uniform resource locator (URL) from the coordinating smart device to the configurable biometric device utilizes a coded radio frequency signal.

In a still yet further embodiment, communicating the first challenge and a response uniform resource locator (URL) from the coordinating smart device to the configurable biometric device utilizes a coded radio frequency signal.

In still yet another embodiment, the process also includes sending additional challenges from the network service to the coordinating smart device to the configurable biometric device and responding to the additional challenges by the configurable biometric device before validating the configurable biometric device.

In a still further embodiment again, the process also includes enrolling a second device with the network service and providing control of the second device using the configurable biometric device.

In still another embodiment again, the process also includes sending a challenge to at least one other biometric device other than the configurable biometric device, enrolling the at least one other biometric device with the network service, and all enrolled biometric devices are required to activate a feature of the network service.

DETAILED DESCRIPTION

Figure 1:
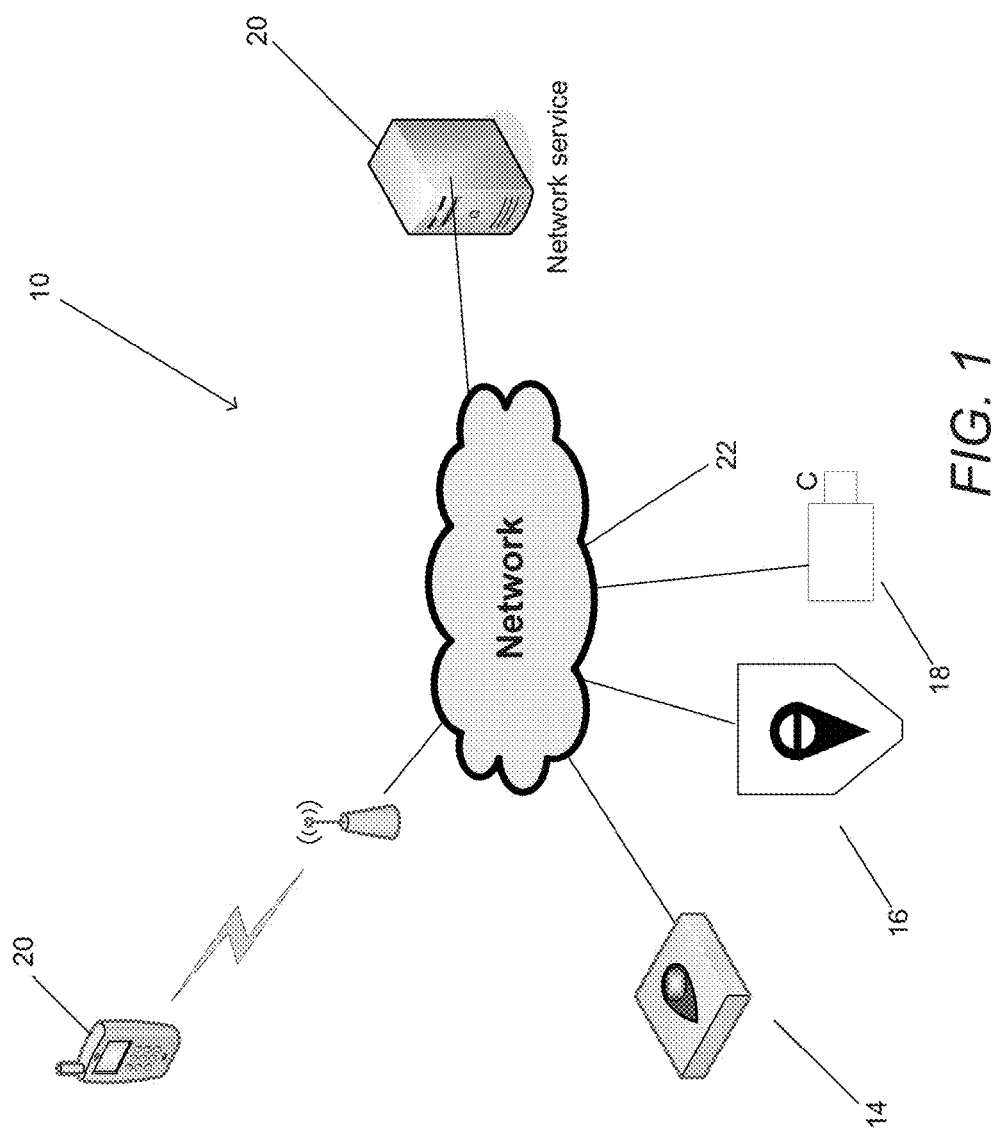
FIG. 1 is a system diagram illustrating a biometric device authentication system in accordance with embodiments of the invention.

Turning now to the drawings, systems and methods for authenticating a biometric device using a coordinating smart device in accordance with various embodiments of the invention are disclosed. A biometric device can provide convenience and efficiency for consumers where actuating the biometric device activates one or more automated features within a residence. For example, a smart-lock with a camera or fingerprint sensor may be used to unlock a door without needing a key. However, biometric devices are often limited in computing resources and/or by not having a display or user interface. Various embodiments of the invention enable a thin biometric device to enroll with a network service through a coordinating smart device, where the coordinating smart device includes computing resources and/or a user interface that can help facilitate the enrollment process. In several embodiments, a coordinating smart device is a smartphone that includes an enrollment application that can communicate with the biometric device via a wireless and/or wired connection. However, biometric information can be acquired by an attacker, especially if it is stored outside a biometric device. Therefore, it is often desirable not to store or transmit the raw biometric information of a user after it is acquired by the secure sub-system of the coordinating smart device. This can create a problem when it is desired to register or enroll a user with a biometric device to access or enable a network service.

The problem is typically solved for most users with their smartphone as the device typically has to be registered with a service provider and the user must provide a residential address and will be sent monthly bills. Service providers and device manufacturers have put safeguards in place to protect users who lose access to their devices (e.g., SIM cards can be deactivated and devices can have their location tracked and can be remotely disabled, etc., through services such as "find my iPhone").

An additional scenario that can be addressed through many embodiments of the invention is to register a configurable biometric device, separate from the coordinating smart device, with the network service using the coordinating smart device as an intermediary to isolate the capture of biometric information. The configurable biometric device can be enrolled with the network service through the coordinating smart device, and subsequent actuation of the configurable biometric device can signal the network service without any interaction with the coordinating smart device. After the biometric device is enrolled, it can act as a token in place of providing passwords, such as the Pico security token. The Pico security token is described in Pico: No more passwords! by Frank Stajano, Proc. Security Protocols Workshop 2011, Aug. 31, 2011, the entirety of which is incorporated herein by reference.

In many embodiments of the invention, authentication of a configurable biometric device utilizes a process that prevents the server from learning all authentication credentials (such as the user password), such as Zero-Knowledge Proof Authentication (ZKP) or a similar protocol, so that the server or a third-party interceptor cannot impersonate the biometric device having obtained all authentication credentials. Stated another way, the configurable biometric device proves its knowledge of its secret (i.e., identifying itself) without revealing the secret.

Systems and methods for performing Zero-Knowledge Proof Authentication (ZKP) include those discussed in "Extending Web Applications with a Lightweight Zero Knowledge Proof Authentication" by Grzonkowski et al. (Proceedings of the 5th International Conference on Soft Computing as Transdisciplinary Science and Technology, ACM, p. 65-70, Oct. 27-31, 2008) and in U.S. Patent Publication No. 2010/0290618, the disclosure from which relevant to ZKP authentication is hereby incorporated by reference in its entirety. In ZKP authentication, the client typically calculates a private key from a user password. Many embodiments of the invention implement ZKP authentication replacing the user password with a secret key and/or device identifier (ID) stored on the biometric device that are unlocked by actuating the biometric device. Additional embodiments of the invention may utilize challenge-response authentication techniques other than ZKP.

Coordinating smart devices and configurable biometric devices that may be utilized in accordance with embodiments of the invention are discussed below.

Biometric Authentication System

A biometric authentication system in accordance with embodiments of the invention is illustrated in FIG. 1. The biometric authentication system 10 includes a coordinating smart device (e.g., a smartphone) 12, a configurable biometric device (e.g., a fingerprint reader 14 or 16 or camera 18), and a network service 20 that can communicate over a network 22. In many embodiments of the invention, the network service 20 is a cloud based service, such as, but not limited to, one providing home automation or home security.

In many embodiments of the invention, the biometric authentication system registers a configurable biometric device 14, 16, or 18 with the network service 20 so that it can activate features of the network service 20 for a user that biometrically authenticates with the configurable biometric device. In several embodiments, the registration of the configurable biometric device 14, 16, or 18 utilizes the coordinating smart device 12 as an intermediary to provide a challenge of a challenge-response authentication method, such as ZKP, from the network service 20 to the configurable biometric device and to return a response from the configurable biometric device to the network service 20. When the challenge-response authentication of the configurable biometric device is completed it can establish a trusted relationship between the network service 20 and the configurable biometric device. Coordinating smart devices that may be utilized in accordance with embodiments of the invention are discussed below.

Coordinating Smart Device

Figure 2:
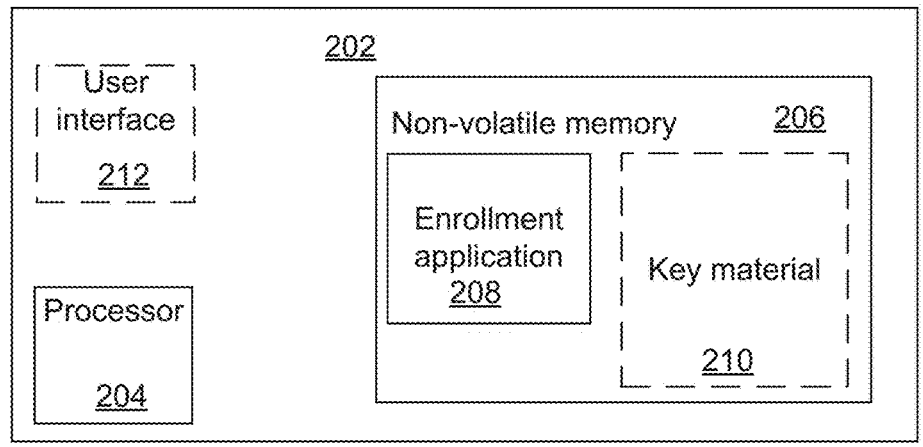
FIG. 2 is a system diagram illustrating a coordinating smart device for authenticating a configurable biometric device in accordance with embodiments of the invention.

A coordinating smart device can be any of a number of electronics devices including, but not limited to, a smartphone, tablet computer, laptop computer and/or other computing device having the appropriate user interface components. In several embodiments, it may be desirable for the ability for the coordinating smart device to be brought into proximity with the configurable biometric device to be configured. Then an additional verification may be made on the proximity of the two devices. A coordinating smart device in accordance with several embodiments of the invention is illustrated in FIG. 2. The coordinating smart device 202 includes a processor 204 and non-volatile memory 206, which includes an enrollment application 208 and optionally key material 210. The enrollment application can configure the processor to perform processes to enroll a configurable biometric device with the network service. In several embodiments, the coordinating smart device 202 includes key material so that it can generate responses to ZKP challenges. In additional embodiments, the coordinating smart device 202 includes a certificate including a public key that can be utilized to encrypt communications with the network service and/or other devices, such as by using a Hypertext Transfer Protocol Secure (HTTPS) connection.

The coordinating smart device 202 can also include a user interface 212 with user interface components. User interface components can include components such as, but not limited to, a display and keypad or touchscreen, camera (for example, for imaging device tags or light signals), microphone (e.g., for detecting coded sound), speaker (e.g., for emitting coded sound) and/or wireless communications transceiver such as, but not limited to, Bluetooth, near-field communication (NFC) tag, and/or radio frequency identifier (RFID). While specific implementations of coordinating smart devices that may be utilized in accordance with embodiments of the invention are described above with respect to FIG. 2, any of a variety of configurations and/or architectures may be utilized as appropriate to the requirements of a given application. Configurable biometric devices that may be utilized in accordance with embodiments of the invention are discussed below.

Configurable Biometric Device

Figure 3:
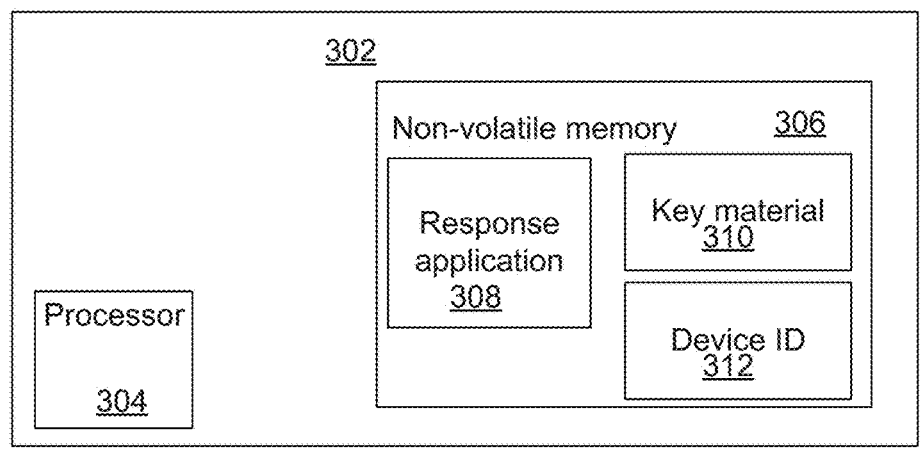
FIG. 3 is a system diagram illustrating a configurable biometric device in accordance with embodiments of the invention.

A configurable biometric device can be any of a number of electronic biometric devices including, but not limited to, a fingerprint reader, camera, eye-iris reader, and/or other computing device having the appropriate user biometric information capture components and which can be communicate with the coordinating smart device. A configurable biometric device in accordance with a number of embodiments of the invention is illustrated in FIG. 3. The configurable biometric device 302 includes a processor 304 and non-volatile memory 306, which includes a response application 308 and key material 310. The response application can configure the processor to perform processes such as those described below to enroll the configurable biometric device with the network service. In several embodiments, the configurable biometric device 302 includes key material 310 with which it can generate responses to ZKP challenges. In further embodiments, the configurable biometric device 302 includes a device identifier (ID) that uniquely identifies the configurable biometric device.

In some embodiments, the configurable biometric device includes an NFC tag, RFID tag, and/or Bluetooth transceiver or other electronic communications transceiver. The specific technique for communicating via a wireless and/or wired communication channel is typically dependent upon the requirements of a given application. Processes for authenticating a configurable biometric device with a network service in accordance with embodiments of the invention are discussed below.

Processes for Authenticating a Configurable Biometric Device

A biometric authentication system as discussed above can include a network service, a coordinating smart device, and a configurable biometric device. In many embodiments of the invention, the coordinating smart device acts as an intermediary to facilitate enrollment of the configurable biometric device with the network service using a challenge-response authentication method, such as ZKP authentication or a similar security process. In many embodiments, the one or more challenges posed from the network service to the configurable biometric device is a problem that only the configurable biometric device can answer, thereby proving its identity. In several embodiments, the response returned from the configurable biometric device to the network service evidences the identity of the configurable biometric device and/or the correctness of its secret without revealing the secret.

The configurable biometric device can capture biometric information as part of the authentication process for one or more users, and can be subsequently actuated by capturing and validating biometric information from a user. The configurable biometric device, once it is enrolled, can signal the network service when it is actuated. In many embodiments, the biometric information is stored securely on the configurable biometric device and/or utilizes secure communications paths between the capturing biometric sensor and storage.

Figure 4:
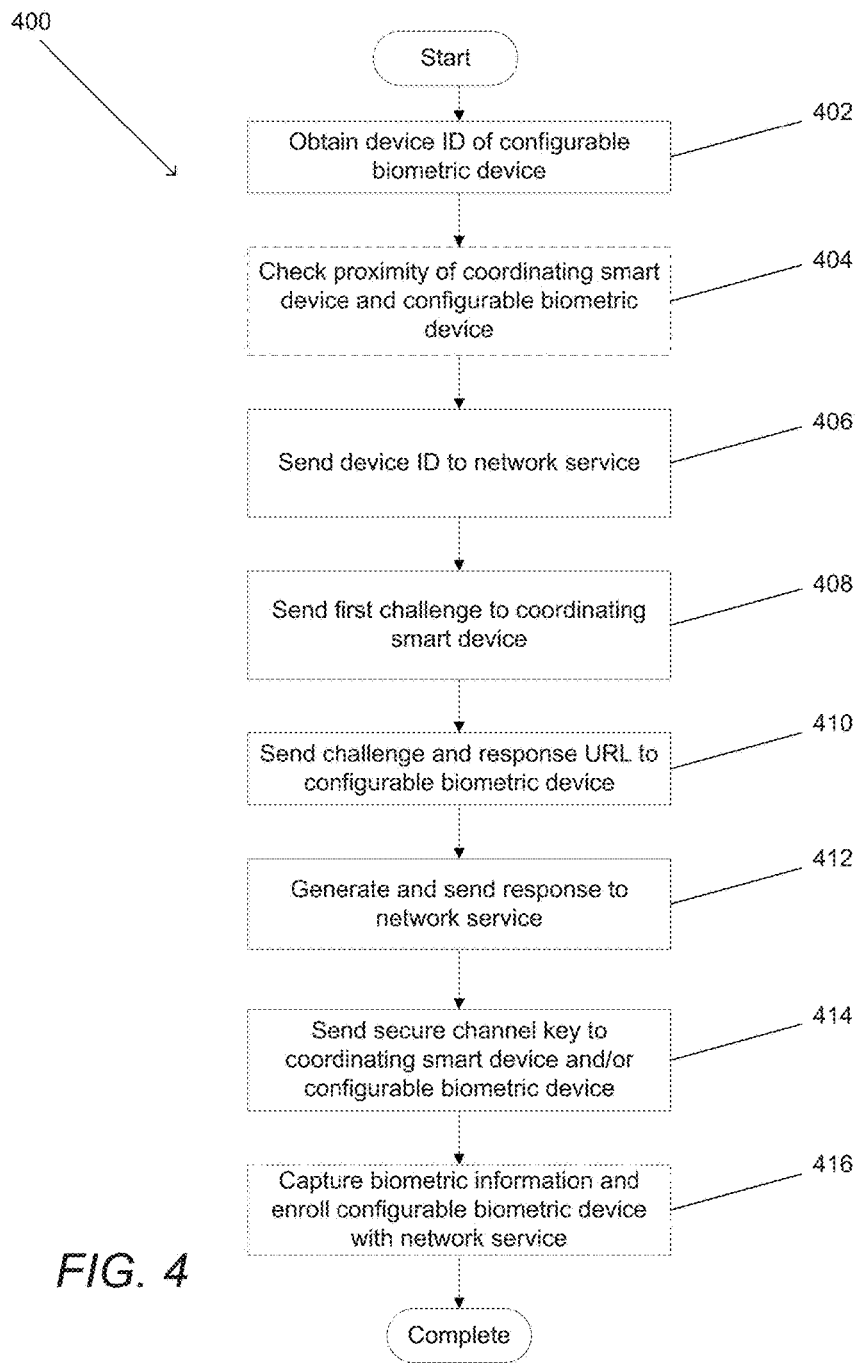
FIG. 4 is a flow chart illustrating a process for enrolling a biometric device with a network service in accordance with embodiments of the invention.

A process for authenticating a configurable biometric device in accordance with embodiments of the invention is illustrated in FIG. 4. The process 400 includes obtaining (402) a device identifier (ID) of the configurable biometric device using the coordinating smart device. In many embodiments of the invention, the device identifier is obtained using any of a variety of out-of-band methods, such as, but not limited to, scanning a visual tag on the configurable biometric device using the camera of the coordinating smart device, or detecting the device identifier via an NFC tag, RFID tag, and/or other electronic communication. In some embodiments, the configurable biometric device is paired to the coordinating smart device over a Bluetooth or similar wireless connection, thereby providing identifying information that can be used as a device ID during or after the pairing process. In additional embodiments of the invention, a Bluetooth radio signal and/or a Wi-Fi Direct handshake could also be used by the coordinating smart device to obtain the device ID from the configurable biometric device, however, such mechanisms may not be regarded as sufficiently secure for some implementations as they may be regarded as prone to wireless signal eavesdropping.

In several embodiments of the invention, the configurable biometric device is a Driver Monitoring System (DMS) located in a car or other vehicle. The DMS can be linked to a network service that provides periodic driver and vehicle status information to an insurance provider or broker. In the event of an accident, the DMS can also act as a black box providing and/or recording data in a secure and privacy-aware manner. In some embodiments, in order to both protect the sensitive DMS data and/or to verify that the current driver of the vehicle is an insured driver, the system is enrolled with one or more driver biometrics using the DMS as will be discussed further below.

In many embodiments of the invention, the device ID is a manufacturer-configured model number or device key for the configurable biometric device. In some embodiments, the device ID is a combination of a device model number and a production batch number. In several embodiments, the device ID is not unique to a single device, but instead the device may belong to a production batch that shares a common manufacturing process and/or device firmware. In addition to the device ID, other information may also be encoded on the configurable biometric device for retrieval by the coordinating smart device, such as a management URL, name and/or model of the configurable biometric device, or other information relevant to the configuration, management, and/or utilization of the configurable biometric device.

In certain preferred embodiments, the configurable biometric device can have a visual tag printed on it (or on the packaging, or on an insert in the packaging) such as, but not limited to, a barcode, matrix code, or two-dimensional code. The device ID and/or the additional information for retrieval by the coordinating smart device can be encoded in the visual tag or stored at a location from which it can be retrieved given the location link encoded in the visual tag. An example of a barcode that may be used as a visual tag is a Quick Response (QR) code. The coordinating smart device may be used to detect the QR code (or similar visual tag) using its camera or similar scanning sensor and obtain the device ID and/or additional information by decoding the QR code. In some embodiments, the visual tag is printed or stamped on the configurable biometric device. In other embodiments, the visual tag can be displayed on a screen or graphical user interface on the configurable biometric device.

wireless communications transceiver such as, but not limited to, Bluetooth, near-field communication (NFC) tag, and/or radio frequency identifier (RFID)

In some embodiments, the configurable biometric device is placed into a "programming mode" during the authentication process. In programming mode, the configurable biometric device expects to be configured, i.e., to participate in an authentication process. Programming mode may be entered, for example, before retrieving the device ID. Programming mode may be entered automatically, for example in response to receiving a programming mode signal transmitted by a coordinating smart device after the coordinating smart device reads the device ID or in response to an NFC event. Alternatively, programming mode may be entered manually by selecting an option from a user interface or a interacting with a physical control on the configurable biometric device.

In several embodiments, the process of obtaining a device ID also includes verifying (404) the local presence of the configurable biometric device to the coordinating smart device. In certain embodiments, the location of both devices may also be checked as an alternative means to verify both devices are proximate.

The coordinating smart device can communicate (406) the device ID of the configurable biometric device to a network service over a secure link that is protected against access by third-parties, such as, but not limited to, a Hypertext Transfer Protocol Secure (HTTPS) connection. As discussed above, a network service can be a cloud service in some embodiments. If secure communication between the coordinating smart device and the network service is not yet established, the coordinating smart device can first authenticate itself to the network service and create a secure link.

In some embodiments of the invention, the device ID is communicated to the network service by the coordinating smart device via a connection to a local area network (LAN). The LAN may have internet access and connect to the network service through the internet. In other embodiments, the coordinating smart device can communicate the device ID to the network service using a wide area data network such as, but not limited to, a cellular data network. In several embodiments, the coordinating smart device is configured by an authentication application to establish a secure connection to the network service. The coordinating smart device can create a secure connection using credentials that are stored on the coordinating smart device and/or credentials that are input via the user interface (e.g., password) and/or generated from information obtained by a component of the coordinating smart device (e.g., biometric scanner such as, but not limited to, a fingerprint or facial reader).

In additional embodiments, the coordinating smart device can be part of a Key-chained Cloud Service (KCS) that stores user credentials and/or metadata remotely (e.g., keys, passwords, certificates, device IDs), and the network service associates the configurable biometric device with the same user and key chain as the coordinating smart device. Credentials and/or metadata utilized by the coordinating smart device to connect with the configurable biometric device can be stored using a KCS such that it is retrievable by the user authenticating themselves with the KCS.

The network service provides (408) the coordinating smart device with a first challenge of a challenge-response authentication protocol. In many embodiments, the first challenge is a Zero-Knowledge Protocol (ZKP) challenge based on the device ID. In using a ZKP protocol, the coordinating smart device need not have the ability to generate a response, so long as the configurable biometric device can generate a response. In some embodiments, the coordinating smart device can also relay a response for the configurable device.

The coordinating smart device communicates (410) the first challenge and a response URL (uniform resource locator) (i.e. an address to which to send a response to the challenge) to the configurable biometric device that is not yet enrolled. In some embodiments, the configurable biometric device may already be connected to the local area network (LAN) or other network providing access to the network service. In other embodiments, if the configurable biometric device is not yet connected to LAN or network, the coordinating smart device provides network configuration information to the configurable biometric device. The configurable biometric device can then connect to the LAN or other network such as, but not limited to, a 4G or 5G wireless data network. In further embodiments, this may involve providing a network name, e.g., WiFi SSID (Service Set Identifier), and password for the LAN.

In some embodiments, the communication of the first challenge and/or the network configuration information from the coordinating smart device to the configurable biometric device is out-of-band, that is, via a mechanism or network that is different from the manner in which the device ID is communicated. This can provide an additional layer of security to the devices. The coordinating smart device may generate and present data representative of the first challenge and/or network configuration information in a form that is recognizable to the configurable biometric device. In further embodiments, the coordinating smart device is configured to provide a coded or modulated audio signal and the configurable biometric device is responsive to audio. Similarly, in different embodiments, the coordinating smart device provides a coded or modulated light signal and the configurable biometric device has light-sensing capabilities. In further embodiments, the coordinating smart device generates an image, for example a QR code, that can be captured by a camera on the configurable biometric device. In additional embodiments, the coordinating smart device provides NFC (near-field communication) pulses and the configurable biometric device has an NFC sensing capability. Other communications, such as Bluetooth, may be used depending on a desired level of security.

The configurable biometric device processes the first challenge and generates (412) a first response to the first challenge, i.e., a first response. In many embodiments, the first response is a ZKP response generated based on the first ZKP challenge. When the configurable biometric device is connected to the network or otherwise is able to communicate to the response URL, it transmits a first response to the response URL. If the response is correct, the network service may confirm the validity of the configurable biometric device, or may provide additional challenges, each of which must be given a correct response by the configurable biometric device for the device to be deemed valid by the network service. In some embodiments, the network service may allow for a certain number of failures while still allowing validity of the configurable biometric device. The number of additional challenges may be predetermined or may depend upon a set of factors that are evaluated at the time the configurable biometric device is responding to the challenges. In further embodiments, a time limit may be set in which an additional challenge must be received by the configurable biometric device or an additional response must be received from the configurable biometric device, or the device will time-out. The time-out status may be indicated such as via a blinking LED or message in software that the connection was not established. For example, a time out status message may be provided from the configurable biometric device to the coordinating smart device and the coordinating smart device may indicate a time-out status.

When the network service determines that the configurable biometric device is valid, it can generate a secure channel key and transmits (414) it to the coordinating smart device, which in turn transmits it to the configurable biometric device. Using the secure channel key, the configurable biometric device can complete a biometric enrollment process using user input to capture biometric information. In many embodiments, the network service transmits the secure channel key to the coordinating smart device directly. However, in such embodiments this can expose the link to various attack modalities such as man-in-the-middle. Furthermore, as limited-UI (user interface) devices often have less computational power than, for example, a smartphone, they can be slower to respond, thus giving an attacker more time to break the encryption. Transmitting the secure channel key via the coordinating smart device can help ensure that the network transport is over an existing secure channel. This can be at the risk of using a relatively unsecured out-of-band communication between the coordinating smart device and the configurable biometric device/system to transmit the key. However, as this communication is often within the control and proximity of the user, the limited risk can be considered acceptable. The configurable biometric device can now establish a secure link with the network service.

The configurable biometric device/system can proceed (416) with a biometric enrollment process capturing biometric information from a user. This may vary according to the biometric used. Several biometrics that may be utilized in accordance with various embodiments of the invention can include, but are not limited to, fingerprint, facial, and/or eye-iris recognition. In a number of embodiments, the configurable biometric device and/or a group of biometric devices can include multiple biometric data capture modalities that provide multiple factor biometric authentication.

In several embodiments, a driver monitoring system (DMS) configurable biometric device includes a near-infrared (NIR) light emitter and/or one or more biometric sensors. The NIR emitter can be used to illuminate a driver's face. The one or more biometric sensors can include, but are not limited to, facial and iris biometric scanners, steering wheel position sensors, and/or fingerprint sensor. The one or more biometric sensors can be used to detect an authorized driver and disable the vehicle if the driver is unauthorized and/or to complete the configurable biometric device authentication process. A facial scanner can be used to detect the driver's face. A iris scanner can be used to detect characteristics of the driver's eye. A steering wheel can be used to detect the position of the steering wheel and using learning algorithms determine whether an authorized driver is moving the wheel. A fingerprint sensor can be placed on the engine start button or elsewhere to detect the driver's fingerprint.

Figure 5:
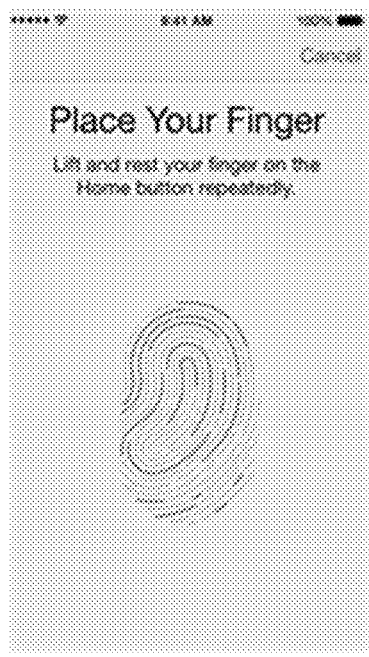
FIGS. 5 and 6 illustrate user interface displays that may be displayed while enrolling a biometric device with a network service in accordance with embodiments of the invention.
Figure 6:
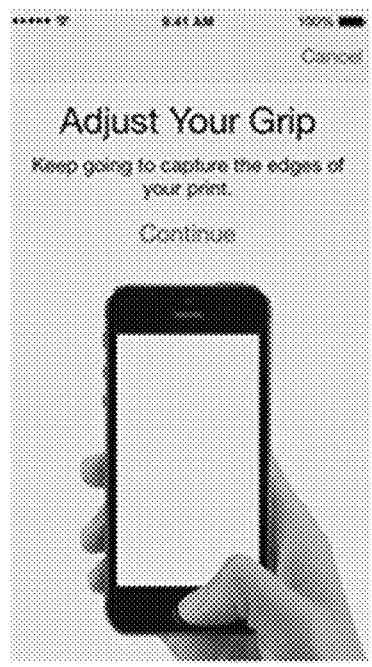

Certain embodiments may utilize touchID enrollment in iOS. An exemplary screen that may be shown in such an enrollment process is illustrated in FIGS. 5 and 6. The process can provide prompts that can include, but are not limited to, the following:

Touch your finger to the iPhone or iPad Home button (Without Press) and Hold it there either you're asked to lift your finger or until you fill a little vibration.

Continue to lift and rest your finger slowly, making small adjustment to the position of your finger each and every time.

If initial Scan complete then now, you'll be asked to adjust your grip to capture the edges of your fingerprint.

Hold (Grip) your device as you normally would when unlocking iPhone or iPad.

In many embodiments, the configurable biometric device creates a new ZKP mapping set once the Touch-ID enrollment is complete. In a preferred embodiment the ZKP elliptic map set is generated from the unique Touch-ID enrollment. In many embodiments of the invention, this map set is generated using information including, but not limited to, the security key provided by the network service, which acts as a unique enrollment ID, and/or a device ID code stored on the configurable biometric device.

In several embodiments, the map set generation information is used to create a new seed for the ZKP maps, through a one-way function generating a string of a pre-determined length; and mapping said string to a permutation $\pi_{priv}$ of a pre-determined order, said permutation being operable with a first graph $G_1$ to generate a second graph $G_2=\pi_{priv}(G_1)$. The second graph is communicated to the network service over the secure link enabled by the secure channel key and the network service transmits an acknowledgement to the coordinating smart device.

In many embodiments, the continued proximity or local connection of the coordinating smart device and the configurable biometric device is repeatedly verified by the network service throughout the process of provisioning the configurable biometric device with the secure channel key. In certain embodiments, the network service may first present a number of challenges to the coordinating smart device to re-confirm its presence and re-authenticate that it is still present and/or located proximate the configurable biometric device. In alternative embodiments, the network service may transmit authentication requests to the configurable biometric device, which then transmits to the coordinating smart device via an out-of-band channel. The coordinating smart device then responds to these challenges directly. Again, the out-of-band channel can confirm the proximity of the two devices.

In several embodiments, the configurable biometric device can be linked with a plurality of other devices through the network service (rather than directly over the local network) to form a secure communications group and employ techniques with the additional benefits of employing the biometric authentication capabilities of the configurable biometric device. Groups of multiple biometric devices may be utilized to provide multi-factor biometric authentication. In some embodiments, the multi-factor authentication is determined by the network service based upon receipt of a plurality of confirmations of local authentications of the biometric devices. In a number of embodiments, the biometric device may provide an authentication means to access a local IoT (internet of things) device network. Multiple devices may be controlled from the biometric device. Similarly, these devices may engage in context aware action and collaborative intelligence coordinated from the network service with the added benefit of robust device security and local biometric authentication.

As an example use case, a biometric device authentication system can provide a means to add a biometric access device to a home network enabling other networked home devices (such as, but not limited to, electronic locks, home security system, security cameras, etc.) to be biometrically enabled/disabled via the configurable biometric device. The configurable biometric device can remain within the home network when the owner of the main coordinating smart device (e.g., a smartphone) leaves with their mobile device.

In several embodiments, the network service can periodically broadcast ZKP challenges to the configurable biometric device to ensure it is still active on the network and the user may be required to re-authenticate themselves in response to certain events or combinations thereof as determined by the network service or by the configurable biometric device itself.

While a specific process for authenticating a configurable biometric device with a network service using a trusted coordinating smart device is discussed above with respect to FIG. 4, one skilled in the art will recognize that any of a variety of processes may be utilized in accordance with embodiments of the invention.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A process for enrolling a configurable biometric device with a network service comprising:
obtaining a device identifier (ID) of the configurable biometric device using a coordinating smart device;
communicating the device ID of the configurable biometric device from the coordinating smart device to the network service using a secure communications link;
communicating a first challenge from the network service to the coordinating smart device, where the first challenge is generated based on a challenge-response authentication protocol;
communicating the first challenge and a response uniform resource locator (URL) from the coordinating smart device to the configurable biometric device;
generating a first response to the first challenge and communicating the first response to the network service utilizing the response URL;
receiving a secure channel key by the coordinating smart device from the network service;
communicating the secure channel key from the coordinating smart device to the configurable biometric device;
performing a biometric enrollment process using the configurable biometric device including capturing biometric information from a user; and
creating a secure communication link between the configurable biometric device and the network service using the secure channel key when the first response satisfies the challenge-response authentication protocol.

2. The method of claim 1, wherein the challenge-response authentication protocol is a zero-knowledge protocol (ZKP) and the first challenge is generated based on an identifier of the configurable biometric device.

3. The method of claim 1, wherein obtaining a unique device identifier (ID) of the configurable biometric device using a coordinating smart device comprises scanning a visual tag on the configurable biometric device using a camera on the coordinating smart device.

4. The method of claim 1, wherein obtaining a unique device identifier (ID) of the configurable biometric device using a coordinating smart device comprises reading a radio frequency tag on the configurable biometric device using radio frequency reader circuitry on the coordinating smart device.

5. The method of claim 1, further comprising verifying the local presence of the configurable biometric device to the coordinating smart device.

6. The method of claim 1, further comprising authenticating a user on the coordinating smart device to create the secure communications link between the coordinating smart device and the network service.

7. The method of claim 1, wherein the coordinating smart device is part of a key-chained cloud service (KCS) and the method further comprises associating the configurable biometric device with the coordinating smart device and the user associated with the coordinating smart device.

8. The method of claim 1, wherein communicating the first challenge and a response uniform resource locator (URL) from the coordinating smart device to the configurable biometric device is performed using a different communication medium than obtaining a device identifier (ID) of the configurable biometric device using a coordinating smart device.

9. The method of claim 1, wherein communicating the first challenge and a response uniform resource locator (URL) from the coordinating smart device to the configurable biometric device utilizes a coded audio signal.

10. The method of claim 1, wherein communicating the first challenge and a response uniform resource locator (URL) from the coordinating smart device to the configurable biometric device utilizes a coded light signal.

11. The method of claim 1, wherein communicating the first challenge and a response uniform resource locator (URL) from the coordinating smart device to the configurable biometric device utilizes a coded radio frequency signal.

12. The method of claim 1, wherein communicating the first challenge and a response uniform resource locator (URL) from the coordinating smart device to the configurable biometric device utilizes a coded radio frequency signal.

13. The method of claim 1, further comprising sending a plurality of additional challenges from the network service to the coordinating smart device to the configurable biometric device and responding to the additional challenges by the configurable biometric device before validating the configurable biometric device.

14. The method of claim 1, further comprising enrolling a second device with the network service and providing control of the second device using the configurable biometric device.

15. The method of claim 1, further comprising sending a challenge to at least one other biometric device other than the configurable biometric device, enrolling the at least one other biometric device with the network service, and all enrolled biometric devices are required to activate a feature of the network service.

\* \* \* \* \*